United States Patent Office 3,221,119
Patented Nov. 30, 1965

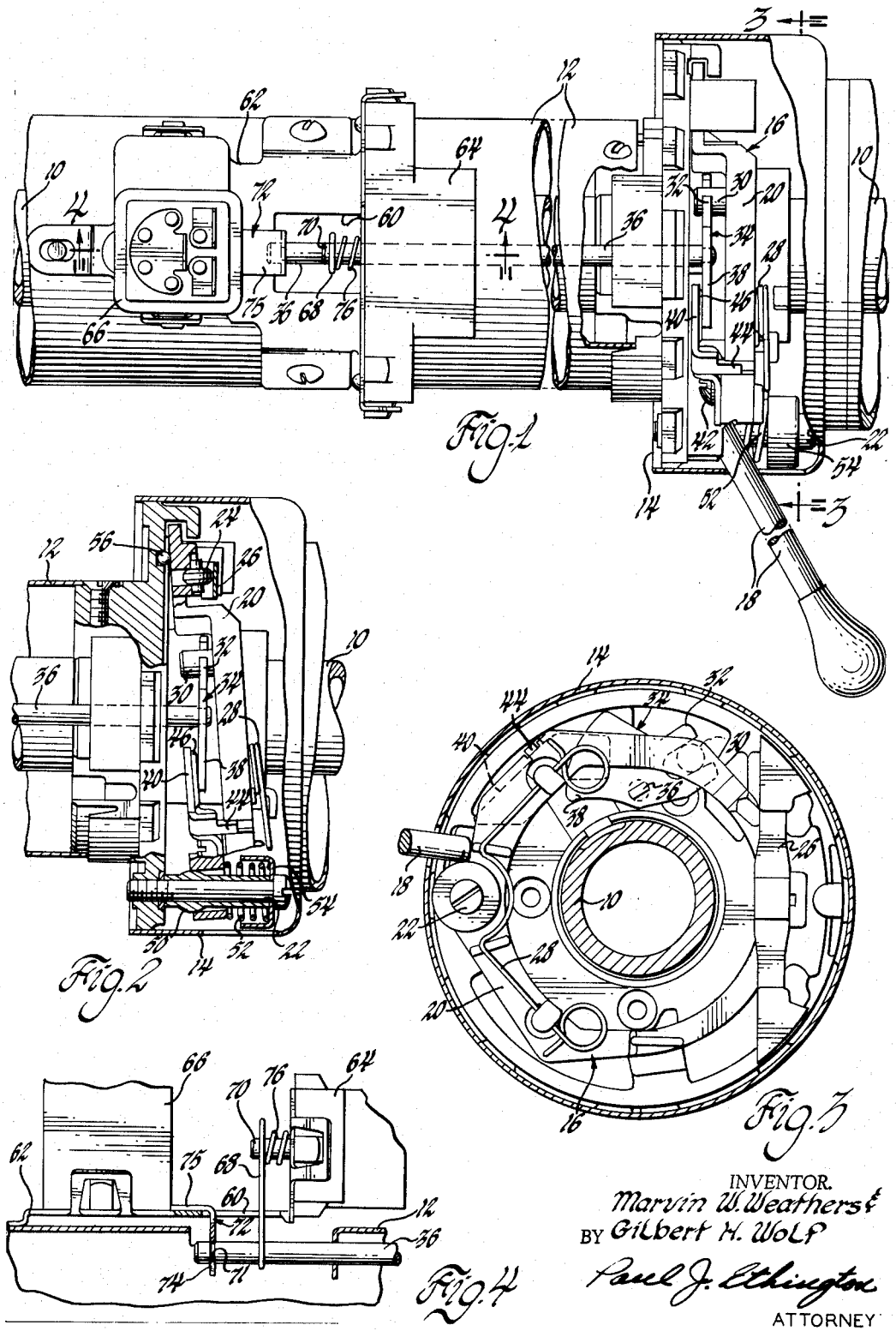

3,221,119
SWITCH ACTUATOR MOVABLE IN DIFFERENT MODES FOR SELECTIVELY OPERATING A PAIR OF SWITCHES
Marvin W. Weathers, Detroit, and Gilbert H. Wolf, Milford, Mich., assignors to General Motors Corporation, Detroit, Mich., a corporation of Delaware
Filed Nov. 6, 1961, Ser. No. 150,415
8 Claims. (Cl. 200—61.27)

This invention relates to a vehicle switch actuator and more particularly to a combination direction signal and headlight dimmer switch actuator.

Conventionally, headlight dimmer switches are mounted on the floor-board of a vehicle for operation by the driver's foot. In many instances, however, it is inconvenient to use the foot to perform this operation for the foot cannot be moved rapidly enough to operate the switch and dim the vehicle headlights as soon as desired. Further, in the construction and assembly of vehicles it is sometimes quite difficult to economically provide a means of installing the dimmer switch in the floorboard or to make the necessary electrical connections thereto.

Accordingly, it is the goal of the present invention to overcome these difficulties using a hand operated dimmer switch actuator, and more particularly, a dimmer switch actuator combined with a direction signal actuator so as to improve the ease of operation of the dimmer switch as well as to reduce the number of light actuators which must be placed in a vehicle.

The invention is carried out by providing a conventional direction signal actuator mechanism with a means to permit motion of the actuating plate in a direction normal to the usual direction of movement of direction signal actuators and to utilize this motion to actuate the light dimmer switch. More particularly, the invention contemplates modifying a direction signal switch of the type having a rotatable rod extending from the operating plate to the direction signal switch mounted on the mast jacket by providing means to move the rod axially upon suitable operation of the lever and by providing a dimmer switch mounted on the mast jacket connected to the rod for actuation upon axial movement thereto.

The above and other advantages of the invention will be made more apparent from the following specification taken in conjunction with the accompanying drawings wherein like reference numerals refer to like parts, and wherein:

FIGURE 1 is a partly broken away elevation view of a combination direction signal and dimmer switch actuator according to the invention;

FIGURE 2 is a partly broken away sectional view of a portion of FIGURE 1;

FIGURE 3 is a sectional view taken along lines 3—3 of FIGURE 1; and

FIGURE 4 is a sectional view taken along lines 4—4 of FIGURE 1.

The embodiment of the invention to be described is a modification of the direction signal actuator shown in Brown et al. 2,863,013. Reference may be had thereto for certain details not described herein.

Referring now to the drawings, and particularly to FIGURE 1, there is illustrated a portion of a vehicle steering column assembly including a steering shaft 10 encased by a steering column or mast jacket 12 which supports a housing 14 at the top thereof. The housing 14 is located adjacent and below the steering wheel (not shown) in the conventional manner. A direction signal switch operating mechanism 16 is disposed within the housing 14 and is of the type adapted for manual setting by a lever 18 to either of two direction signal operating positions and effective upon rotation of the steering wheel in a correlated direction to automatically return the mechanism to neutral from either operating position. In particular, the assembly comprises an actuator plate or ring 20 secured to the lever 18 and pivoted on a pin 22 which is in turn fastened to the housing 14. The ring 20 is yieldably held in a neutral position by a detent arrangement comprising a roller 24 at the side opposite the pivot pin 22 acting in cooperation with an undulated spring cam 26. Similarly this detent arrangement 24, 26 yieldably holds the ring in either right or left operating position when moved thereto by manual operation of the lever 18. A spring member 28 extending from one side of the actuator ring 20 to the other on opposite sides of the pivot pin forms a circular loop near each end. When the actuator ring is moved to one of the operating positions, one of these loops serves as a pawl to engage a cam, not shown, secured to the steering wheel to effect return of the actuator ring to neutral position upon appropriate rotation of the steering wheel, as more particularly explained in Brown et al. 2,800,541.

At one side of the actuator ring 20 intermediate the pivot pin and roller 24, a cylindrical pin 30 extends downwardly. The pin 30 is embraced by a forked portion 32 of a crank arm 34 which is secured to a crank rod 36. The crank arm 34 has a flat fan-shaped portion 38 extending toward the pivot pin 22 in a plane parallel to the plane of the actuator ring 20 when in the normal position of FIGURE 1. A finger 40 depends from the actuator ring 20 and extends underneath the fan-shaped portion 38 of the crank arm 34 in slidable engagement therewith. The finger 40 is illustrated as being connected to the actuator ring 20 by means of a screw 42 and a tongue-and-groove connection 44. However, the method of securing the finger 40 to the actuator ring 20 is optional and indeed the finger may be formed integrally with the ring 20. The finger 40 has an elongated embossed portion 46 with rounded corners making contact with the under surface of crank arm 34 to thereby permit low friction slidable movement therebetween. A sleeve having a spheroidal portion 50 fits around the pivot pin 22 and forms a pivot surface for the actuator ring 20 so that the ring 20 may be readily moved upwardly about a second pivot point, to be described, without binding on the pivot pin. A compressed coil spring 52 around the pivot pin 22 and between the actuator ring 20 and a cap 54 biases the actuator ring 20 to its lowermost position. The floor of the housing 14 opposite the pivot pin 22 carries a ball 56 to provide a second pivot point for the actuator ring 20. The lower surface of the actuator ring near the roller 24 rests on the ball 56 and pivots thereon when the lever 18 is manually raised toward the steering wheel to move the actuator from the position shown in FIGURE 1 to that shown in FIGURE 2. During such a movement the crank arm 34 will likewise be raised by the finger 40 and the rod 36 will be shifted axially upwardly.

The rod 36 extends from the housing 14 downwardly within the mast jacket 12 and terminates near a rectangular opening 60 which is surrounded by a bracket 62 secured to the mast jacket by screws. A multi-position direction signal switch 64 is mounted on the bracket above the opening 60 while a headlight dimmer switch 66 is mounted on the bracket below the opening 60. A second crank arm 68 is rigidly secured to the rod 36 and extends through the opening to engage an operating pin 70 on the direction signal switch 64 so that the switch may be moved to right turn, left turn, or neutral position according to the angular position of the rod 36. The rod 36 has a groove 71 near its lower end and a third arm 72 having a forked end 74 fits within the groove 71 to provide a pivotal, axially fixed connection of the arm 72 to the rod. The arm 72 extends through the opening 60 and has a portion 75 connected to the headlight dimmer switch 66 to serve as the actuator plunger therefor. The dimmer switch 66 may be of any type which responds to linear movement of an actuator plunger 75 although the conventional ratchet type dimmer switch is preferred. When the lever 18 is raised to shift the rod 36 upwardly as previously described, the plunger 75 will likewise be shifted to actuate the switch 66, but when the lever 18 is released the actuator ring 20 is returned to its normal position of FIGURE 1 by the spring 52 and the rod 36 is returned to its normal position by a coil compression spring 76 around the pin 70 on the direction signal switch which urges the crank arm 68, the rod 36, and the plunger 72 down to neutral position.

In operation, the direction signal is actuated in a manner identical to that described in Brown et al. 2,863,013; that is, the vehicle operator manually moves the lever 18 so as to rotate the actuator ring 20 about the pivot pin 22. Then the pin 30 depending from the actuator ring 20 will coact with the forked portion 32 of the crank arm 34 to rotate the crank rod 36 in a direction corresponding to the direction of rotation of the actuator ring 20. The second crank arm 68 then swings through an arc and moves the pin 70 of the direction signal switch 64 so as to move the switch to either right turn or left turn position.

To operate the dimmer switch 66 the lever 18 is pulled by the operator up toward the steering wheel so as to rock the actuator ring 20 about the ball 56 into the position of FIGURE 2 and hence move the crank rod 36 axially toward the steering wheel. The arm 72 then moves axially with the rod 36 and the actuator plunger 75 steps the dimmer switch to a new position. When the vehicle operator releases the lever 18 the actuator ring 20 is urged back to the normal position of FIGURE 1 by the spring 52 and the crank rod 36 and the plunger 75 are urged back to normal position by the spring 76 coacting between the direction signal switch 64 and the crank rod arm 68.

Ordinarily it will be desired to operate only the direction signals or the dimmer switch at any particular moment, but if desired, both switches may be operated simultaneously by moving the lever 18 into either operating position and simultaneously pulling it toward the steering wheel.

Thus it will be readily seen that the present invention provides a convenient means for mounting and assembling a dimmer switch for manual operation and at the same time provide a dimmer switch which need not occupy space on the floorboard of a vehicle and which does not require foot operation.

The embodiment of the invention disclosed herein is for illustrative purposes only and the scope of the invention is intended to be limited only by the following claims.

We claim:

1. In combination, a direction signal switch, a headlight dimmer switch, and a switch actuator comprising direction signal actuating means, means for selectively pivoting the actuating means about two different axes, a movable operating member mechanically connecting both switches to the said actuating means for selectively actuating the switches, means for rotating the member upon pivoting of the first means about one axis to thereby actuate one of the switches and means for linearly reciprocating the member upon pivoting of the first means about the other axis to thereby actuate the other of the switches.

2. In combination, a direction signal switch, a headlight dimmer switch, and a switch actuator comprising direction signal actuating means, means for selectively pivoting the actuating means about two different axes, a movable intermediate operating means mechanically connecting the switches to the said actuating means for selectively actuating the switches, means for moving the operating means in one direction upon pivoting of the actuating means about one axis to thereby actuate one of the switches and means for linearly moving the operating means in another direction upon pivoting of the first means about the other axis to thereby actuate the other of the switches.

3. In combination, a direction signal switch, a headlight dimmer switch, and a switch actuator comprising direction signal actuating means, a crank rod mechanically connecting both switches to the said actuating means for selectively actuating the switches, means for selectively pivoting the actuating means about two mutually perpendicular axes, means for rotating the rod upon pivoting of the actuating means about one axis to thereby actuate one of the switches and means for reciprocating the rod upon pivoting of the actuating means about the other axis to thereby actuate the other of the switches.

4. In combination, a direction signal switch, a headlight dimmer switch, and a switch actuator comprising a housing supporting the said switches, an actuator ring pivotally mounted on said housing for movement in the plane of the ring, an operating lever secured to the ring near the pivot point thereof, a crank rod mechanically connected to the switches for selectively actuating the the switches and mechanically connected to the actuator ring for rotation upon movement of the ring about an axis perpendicular to the plane of the ring, means for moving the ring about a second axis perpendicular to the first axis, means for axially moving the crank rod upon movement of the ring about the second axis whereby the crank rod will actuate the direction signal switch upon rotation and will actuate the dimmer switch upon axial movement.

5. A switching apparatus including a switch actuator, a direction signal switch, a headlight dimmer switch, the actuator comprising a housing, an actuator plate pivotally mounted on said housing for movement in the plane of the actuator plate, an operating lever secured to the plate near the pivot point thereof, a transmission member mechanically connected to the switches for operation thereof, the transmission member being movably connected to the housing and movably connected to the actuator plate for movement in one direction upon movement of the actuator plate in its plane, means for rocking the actuator plate into another plane, and means for moving the transmission member in another direction upon movement of the actuator plate into the another plane whereby the transmission member will selectively actuate the direction signal switch and the dimmer switch.

6. A switching apparatus including a switch actuator, a direction signal switch and a headlight dimmer switch, the actuator comprising a housing, an actuator ring pivotally mounted on said housing for movement in the plane of the actuator ring, an operating lever secured to the actuator ring near the pivot point thereof, a crank rod mechanically connected to the switches for actuation thereof, the crank rod being movably connected to the housing the connected to the actuator ring for rotation upon movement of the actuator ring in its plane, means for rocking the actuator ring into another plane, means for axially moving the crank rod upon movement of the ring into another plane whereby the crank rod will actuate one of the switches upon rotation and will actuate the other of the switches upon axial movement.

7. A switching apparatus including a switch actuator, a direction signal switch and a headlight dimmer switch, the actuator comprising a housing, an actuator ring pivotally mounted on said housing for movement in its plane, an operating lever secured to the actuator ring near the pivot point thereof, a crank rod mechanically connected to the switches and movably associated with the housing and mechanically connected to the actuator ring for rotation upon movement of the actuator ring in its plane, means for rocking the actuator ring into another plane, a flat extension on the crank rod disposed below the actuator ring and substantially parallel to the plane thereof, a finger depending from the actuator ring and slidably engaging the lower surface of the extension for axially moving the crank rod upon movement of the actuator ring into another plane whereby the crank rod will actuate the direction signal switch upon rotation and will actuate the dimmer switch upon axial movement.

8. In combination, two separate electrical switches and a switch actuator comprising an actuating means, means for selectively pivoting the actuating means about two different axes, a movable operating member mechanically connecting both switches to the said actuating means for selectively actuating the switches, means for rotating the member upon pivoting of the first means about one axis to thereby actuate one of the switches and means for linearly reciprocating the member upon pivoting of the first means about the other axis to thereby actuate the other of the switches.

References Cited by the Examiner

UNITED STATES PATENTS

| 440,845 | 11/1890 | Herrick | 200—63 |
| 1,709,068 | 4/1929 | Forseille | 200—4 X |
| 2,453,035 | 11/1948 | Ponsy | 200—61.54 |
| 2,800,541 | 7/1957 | Brown et al. | 200—61.34 |
| 2,863,013 | 12/1958 | Brown et al. | 200—61.34 |

FOREIGN PATENTS

| 158,046 | 6/1940 | Austria. |
| 655,344 | 1/1963 | Canada. |
| 779,956 | 1/1935 | France. |
| 959,853 | 10/1949 | France. |
| 448,142 | 5/1949 | Italy. |
| 561,176 | 4/1957 | Italy. |

BERNARD A. GILHEANY, *Primary Examiner.*